US008517641B2

(12) United States Patent
Dubon et al.

(10) Patent No.: US 8,517,641 B2
(45) Date of Patent: Aug. 27, 2013

(54) ANCHORING ADHESIVE COMBINATION AND INTEGRATED METHOD OF APPLYING IT

(75) Inventors: William Dubon, Bloomingdale, IL (US); Stanley J. Cabaj, Park Ridge, IL (US); Owen J. McGarel, Naperville, IL (US); Robert L. Turck, Highland Park, IL (US); Andrew J. Rourke, Batavia, IL (US); Deepak H. Mehta, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 358 days.

(21) Appl. No.: 12/506,671

(22) Filed: Jul. 21, 2009

(65) Prior Publication Data

US 2011/0016813 A1    Jan. 27, 2011

(51) Int. Cl.
*E02D 20/00* (2006.01)

(52) U.S. Cl.
USPC .......................... 405/259.6; 411/82.3; 52/707

(58) Field of Classification Search
USPC ............. 52/309.3, 309.5, 366, 704, 698, 707; 411/82.2, 82.3, 903; 405/259.4, 259.5, 259.6
See application file for complete search history.

(56) References Cited

U.S. PATENT DOCUMENTS

| 2,410,047 | A | * | 10/1946 | Burrows et al. ............... 29/421.1 |
| 2,573,880 | A | * | 11/1951 | Temple ....................... 405/259.3 |
| 3,108,443 | A | * | 10/1963 | Schuermann et al. ..... 405/259.6 |
| 3,298,144 | A | * | 1/1967 | Fischer .............................. 52/98 |
| 3,308,585 | A | * | 3/1967 | Fischer ....................... 405/259.5 |
| 3,494,990 | A | | 2/1970 | Balint |

(Continued)

FOREIGN PATENT DOCUMENTS

| AU | 48487/97 | 6/1998 |
| BE | 754232 | 12/1970 |

(Continued)

OTHER PUBLICATIONS

La nouvelle recharge pour chevilles chimiques HVU Hilti: une championne qui sait "encaisser"!, company brochure (9 pages), Hilti (Suisse) SA, (1996).

(Continued)

*Primary Examiner* — William Gilbert
*Assistant Examiner* — James Ference
(74) *Attorney, Agent, or Firm* — Pauley Petersen & Erickson

(57) ABSTRACT

An anchoring adhesive combination includes a slug or package of chemical anchoring adhesive having a proximal end and a distal end and a rod which can be a penetrator having a pointed proximal end, and open distal end, and a threaded or corrugated outer surface. The pointed proximal end of the penetrator is connected to the distal end of the slug or package of chemical anchoring adhesive so that the pointed proximal end is at least partially surrounded by chemical anchoring adhesive. The open distal end of the penetrator receives a proximal end of an anchor pin to form a combination of anchor pin, penetrator and slug or package of anchoring adhesive in series. By placing the combination adjacent to a borehole and simply pounding a distal end of the anchor pin an integrated method is performed whereby a) anchoring adhesive is released and mixed in the borehole, b) the inner wall of the borehole is scrubbed and scored by the outer surface of the penetrator, and c) the anchor pin is both mechanically anchored in the borehole using the penetrator and chemically anchored using the mixed chemical anchoring adhesive.

20 Claims, 2 Drawing Sheets

(56) References Cited

U.S. PATENT DOCUMENTS

| | | | |
|---|---|---|---|
| 3,708,379 A | 1/1973 | Flint | |
| 3,781,965 A | 1/1974 | Bone | |
| 3,837,981 A | 9/1974 | Flint | |
| 3,877,235 A * | 4/1975 | Hill | 405/259.6 |
| 3,971,117 A * | 7/1976 | Osterhout et al. | 249/174 |
| 4,040,471 A * | 8/1977 | McCray et al. | 164/92.1 |
| 4,105,114 A * | 8/1978 | Knox et al. | 405/259.6 |
| 4,263,832 A * | 4/1981 | Lang et al. | 411/15 |
| 4,340,637 A * | 7/1982 | Koob et al. | 428/220 |
| 4,516,885 A * | 5/1985 | Calandra, Jr. | 405/259.6 |
| 4,516,886 A * | 5/1985 | Wright | 405/259.6 |
| 4,560,902 A * | 12/1985 | Kardon | 313/502 |
| 4,601,614 A * | 7/1986 | Lane et al. | 405/259.6 |
| 4,607,984 A * | 8/1986 | Cassidy | 405/259.6 |
| 4,611,954 A * | 9/1986 | Cassidy | 405/259.6 |
| 4,648,753 A * | 3/1987 | Stephan | 405/259.5 |
| 4,652,193 A * | 3/1987 | Hibbs | 411/82.3 |
| 4,659,258 A * | 4/1987 | Scott | 405/259.6 |
| 4,678,374 A * | 7/1987 | Calandra, Jr. | 405/259.6 |
| 4,679,966 A * | 7/1987 | Yacisin | 405/259.6 |
| 4,759,888 A * | 7/1988 | Brest van Kempen | 405/259.6 |
| 4,848,797 A * | 7/1989 | Vercillo et al. | 281/21.1 |
| 5,027,981 A * | 7/1991 | Magister | 222/137 |
| 5,033,910 A * | 7/1991 | Wright | 405/259.6 |
| 5,098,228 A * | 3/1992 | Mauthe | 405/259.6 |
| 5,104,266 A * | 4/1992 | Daryoush et al. | 405/259.5 |
| 5,129,977 A | 7/1992 | Leatherman | |
| 5,161,916 A * | 11/1992 | White et al. | 405/259.6 |
| 5,229,438 A * | 7/1993 | Ishida et al. | 523/428 |
| 5,244,314 A * | 9/1993 | Calandra et al. | 405/259.4 |
| 5,249,898 A * | 10/1993 | Stepanski et al. | 411/82.2 |
| 5,282,697 A * | 2/1994 | Maechtle | 405/259.6 |
| 5,315,800 A * | 5/1994 | Weber et al. | 52/309.1 |
| 5,352,308 A | 10/1994 | Tomihara et al. | |
| 5,392,573 A * | 2/1995 | Gould | 52/165 |
| 5,447,593 A * | 9/1995 | Tanaka et al. | 156/307.3 |
| 5,486,096 A | 1/1996 | Hertel et al. | |
| 5,490,365 A * | 2/1996 | Roth | 52/704 |
| 5,544,980 A * | 8/1996 | Seegmiller | 405/259.6 |
| 5,544,981 A * | 8/1996 | Nishida et al. | 405/259.6 |
| 5,554,240 A * | 9/1996 | Toy | 156/83 |
| 5,562,377 A * | 10/1996 | Giannuzzi et al. | 411/82 |
| 5,714,216 A * | 2/1998 | Banhardt et al. | 428/34.4 |
| 5,725,341 A * | 3/1998 | Hofmeister | 411/82 |
| 5,730,557 A * | 3/1998 | Skupien et al. | 405/259.6 |
| 5,731,366 A * | 3/1998 | Moench et al. | 523/211 |
| 5,785,463 A * | 7/1998 | Eaton et al. | 405/302.2 |
| 5,807,051 A * | 9/1998 | Heminger | 411/82 |
| 5,895,186 A * | 4/1999 | Giannuzzi et al. | 411/82 |
| 5,953,879 A * | 9/1999 | Fischer et al. | 52/704 |
| 5,965,635 A * | 10/1999 | Rancich et al. | 523/176 |
| 6,033,153 A | 3/2000 | Fergusson | |
| 6,033,170 A * | 3/2000 | Gold | 411/480 |
| 6,228,207 B1 * | 5/2001 | Rancich et al. | 156/327 |
| 6,291,555 B1 | 9/2001 | Surjan et al. | |
| 6,393,795 B1 * | 5/2002 | Irwin et al. | 52/698 |
| 6,402,434 B1 | 6/2002 | Surjan et al. | |
| 6,403,678 B1 * | 6/2002 | Surjan et al. | 523/211 |
| 6,416,256 B1 * | 7/2002 | Surjan et al. | 405/259.5 |
| 6,420,458 B1 | 7/2002 | Surjan et al. | |
| 6,822,017 B2 | 11/2004 | Kish et al. | |
| 6,837,018 B1 * | 1/2005 | Hagel et al. | 52/698 |
| 7,163,971 B2 | 1/2007 | Rancich et al. | |
| 7,226,650 B2 | 6/2007 | Liu et al. | |
| 7,244,793 B2 * | 7/2007 | Liu et al. | 525/524 |
| 7,368,170 B2 | 5/2008 | Liu et al. | |
| 7,411,010 B2 | 8/2008 | Kish et al. | |
| 7,591,328 B2 * | 9/2009 | Guede | 175/118 |
| 7,596,917 B2 * | 10/2009 | Schloemer et al. | 52/293.3 |
| 7,708,500 B2 * | 5/2010 | Buquet et al. | 405/259.6 |
| 7,818,940 B2 * | 10/2010 | Herb | 52/704 |
| 2008/0304920 A1 * | 12/2008 | Buquet et al. | 405/259.5 |

FOREIGN PATENT DOCUMENTS

| | | |
|---|---|---|
| BE | 784024 | 9/1972 |
| BE | 830102 | 10/1975 |
| BE | 830269 | 10/1975 |
| BE | 840460 | 8/1976 |
| BE | 855086 | 9/1977 |
| DE | 2012908 | 10/1971 |
| DE | 1603819 | 8/1975 |
| DE | 2423410 | 11/1975 |
| DE | 2925508 | 1/1981 |
| DE | 3518277 | 4/1986 |
| DE | 4136145 | 5/1993 |
| DE | 4141990 | 6/1993 |
| DE | 29610947 | 8/1996 |
| DE | 197 34 302 | 2/1999 |
| DE | 197 36 850 | 2/1999 |
| DE | 197 39 764 | 3/1999 |
| EP | 0144039 | 6/1985 |
| EP | 0 849 345 | 6/1998 |
| FR | 1593972 | 6/1970 |
| FR | 2051848 | 4/1971 |
| FR | 2073549 | 10/1971 |
| GB | 1344741 | 1/1974 |
| GB | 1346674 | 2/1974 |
| GB | 1381276 | 1/1975 |
| GB | 2241759 | 9/1991 |
| GB | 2289737 | 11/1995 |
| WO | WO 98/55772 | 12/1998 |
| WO | WO 2007080478 A1 * | 7/2007 |

OTHER PUBLICATIONS

Technical Guide Supplement Hilti HVA Adhesive Anchoring System (11 pages), Hilti, Inc., 1997.

Shell Resins, EPON® RESIN 828 specification sheet, Shell Oil Co., undated.

Epoxy Curing Agents and Diluents, ANCAMINE® 1856 Curing Agent specification sheet, Air Products and Chemicals, Inc., undated.

Epoxy Curing Agents and Modifiers, ANCAMINE® K54 Curing Agent specification sheet, Air Products and Chemicals, Inc., Feb. 1998.

Epoxy Curing Agents, ANCAMINE® 1767 Curing Agent specification sheet, Air Products and Chemicals, Inc., Nov. 1997.

Epoxy Curing Agents, specification sheets (5 pages), Air Products and Chemicals, Inc., undated.

Acceptance Criteria for Adhesive Anchors in Concrete and Masonry Elements, International Conference of Building Officials, 1-11, Jan. 1999.

Iron and Steel, Textbook, Section 6, pp. 17-30, undated.

* cited by examiner

ANCHORING ADHESIVE COMBINATION AND INTEGRATED METHOD OF APPLYING IT

FIELD OF THE INVENTION

This invention is an anchoring adhesive combination and an integrated method that combines the steps of applying a chemical anchoring adhesive and an anchor pin into a borehole.

BACKGROUND OF THE INVENTION

Chemical anchoring adhesives are used to maintain anchor pins in boreholes that are upside down and vertical, or horizontal, or oriented at any angle. The anchoring adhesives and anchor pins are useful in industrial or commercial construction applications such as bridges, airports, highways, skyscrapers, stadiums and tunnels. In a typical application, a borehole is drilled into a substrate member formed of concrete, steel, wood, or a combination thereof, or another material. Then, the interior of the borehole is cleaned and scrubbed to remove dust and dirt particles. Then, the borehole is filled with a measured amount of anchoring adhesive. Then, a driving tool is used to drive an anchor pin into the borehole.

A typical anchor pin may be threaded, and may have a flat or pointed forward end. A typical driving tool uses rapid rotational movement to spin the anchor pin into the borehole. The driving tool may operate at about 500-3000 rpm, suitably about 1000-2500 rpm, desirably about 1400-2000 rpm. Some driving tools employ a combination of hammering (axial motion) and rotational motion.

Chemical anchoring adhesives and methods of applying them are disclosed in U.S. Pat. No. 6,291,555, issued to Surjan et al.; U.S. Pat. No. 6,402,434, issued to Surjan et al.; U.S. Pat. No. 6,403,678, issued to Surjan et al.; U.S. Pat. No. 6,416,256, issued to Surjan et al.; U.S. Pat. No. 6,420,458, issued to Surjan et al.; U.S. Pat. No. 7,226,650, issued to Liu et al.; and U.S. Pat. No. 7,368,170, issued to Liu et al. These patents are incorporated herein by reference in their entireties.

Additional chemical anchoring adhesives and methods of applying them are disclosed in U.S. Pat. No. 7,411,010, issued to Kish et al.; U.S. Pat. No. 7,163,971, issued to Rancich et al.; U.S. Pat. No. 6,822,017, issued to Kish et al.; U.S. Pat. No. 6,228,207, issued to Rancich et al. and U.S. Pat. No. 5,965,635, issued to Rancich et al. These patents are incorporated herein by reference in their entireties.

Due to cost pressures in the construction industries, there is a need or desire for simpler, more cost-effective techniques of applying chemical anchoring adhesives and anchor pins to boreholes.

SUMMARY OF THE INVENTION

The present invention is directed to an anchoring adhesive combination and integrated method of applying a chemical anchoring adhesive and anchor pin to a borehole. The integrated method reduces the cost by up to two-thirds compared to previous methods where anchoring adhesives and anchor pins were applied separately.

A slug or package of chemical anchoring adhesive is provided in a desired quantity suitable for use in a borehole. The slug or package has a proximal end and a distal end. The distal end of the slug or package is attached to a rod which can be a penetrator having a sharp pointed proximal end projecting into the slug or package, an open (suitably internally threaded) distal end for receiving a proximal (suitably threaded) end of an anchor pin, and a threaded or corrugated outer surface having an outer diameter approximately equal to an inner diameter of a borehole.

The threaded anchor pin has a proximal end and a distal end. The proximal end is screwed into the threaded open end of the penetrator to provide a combination including the anchor pin, penetrator and slug or package of anchoring adhesive in series. The combination is positioned above the borehole and is inserted into the borehole by hammering or otherwise driving the distal end of the threaded anchor pin.

The driving of the threaded anchor pin first causes the penetrator or other rod to further penetrate the slug or package of chemical anchoring adhesive and drive the chemical anchoring adhesive into the borehole, while mixing the chemical anchoring adhesive. Then, the driving causes the penetrator or other rod to enter the borehole whereupon it scrapes and cleans the walls of the borehole and compresses and further mixes the anchoring adhesive. The compression also creates a back pressure of air which helps blow particles from the walls of the borehole. Then, the driving pushes the penetrator to the bottom of the borehole, causing the compressed, mixed anchoring adhesive to pass between the penetrator and wall of the borehole and fill the space between the anchoring pin and the wall of the borehole.

In essence, the invention reduces the insertion of the chemical anchoring adhesive and anchor pin into three simple steps, namely a) attaching a sharp end of a penetrator or end of another rod to a slug or package of chemical anchoring adhesive or providing this combination, b) attaching an anchor pin to an open end of the penetrator to form a combination of anchor pin, penetrator, and slug or package of anchoring adhesive, and c) hammering or otherwise driving the combination into the borehole. Prior art methods required up to nine steps and often required more complex equipment, such as rotational driving tools.

With the foregoing in mind, it is a feature and advantage of the invention to provide an anchoring adhesive combination and a simple, integrated method for applying chemical anchoring adhesive and an anchor pin to a borehole which is significantly less expensive than prior art methods that applied the anchoring adhesive and anchor pins using separate series of steps. The foregoing and other features and advantages of the invention will become further apparent from the following detailed description of the invention, read in conjunction with the accompanying drawings.

DETAILED DESCRIPTION OF THE INVENTION

Figure 1:
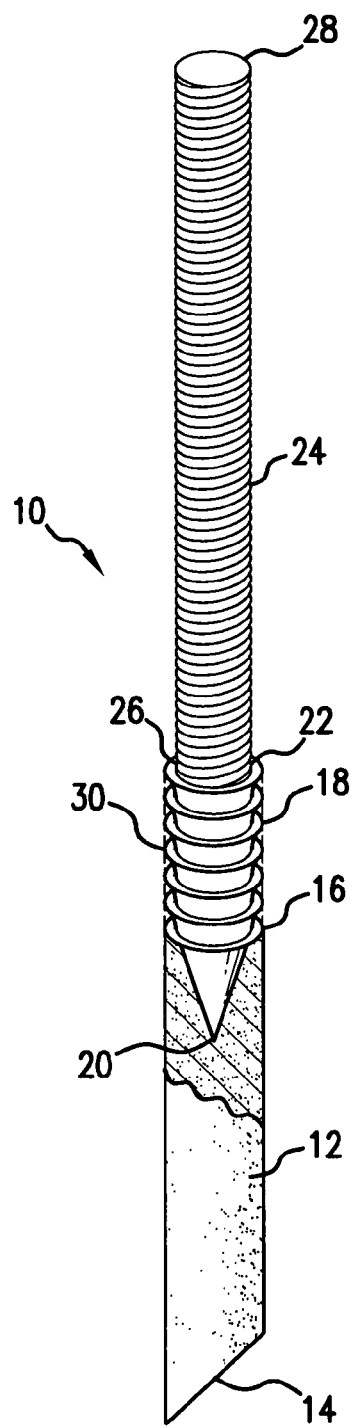
FIG. 1 is a perspective view of a combination including anchor pin, penetrator and adhesive package or slug, connected together in series.
Figure 2:
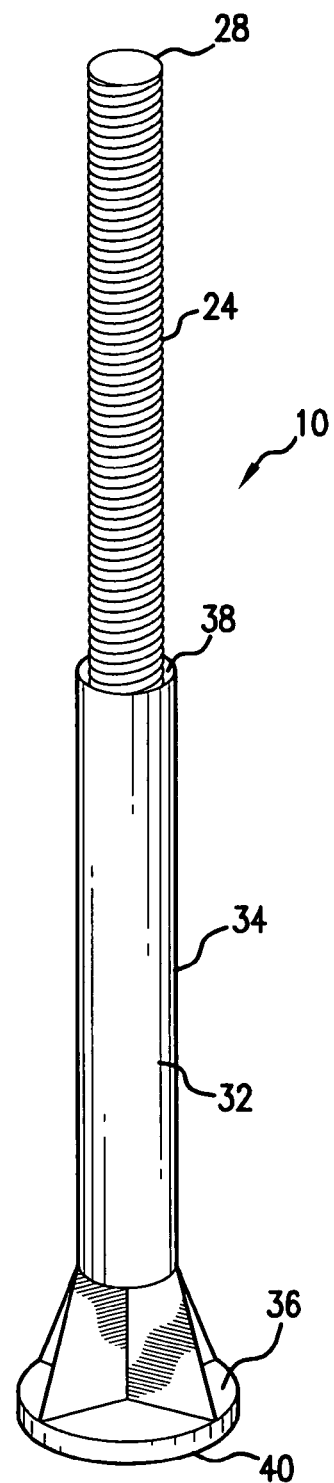
FIG. 2 illustrates the combination of FIG. 1 with a protective jacket covering the penetrator and adhesive package or slug. The product may be sold in this fashion, with or without the anchor pin.

Referring to FIGS. 1 and 2, a combination 10 includes a slug or package 12 of chemical anchoring adhesive having a proximal end 14 and distal end 16, a penetrator 18 having a sharp pointed proximal end 20 and an open internally threaded distal end 22, and a threaded anchor pin 24 having a proximal end 26 and distal end 28.

To form the combination 10, the distal end 16 of adhesive slug or package 12 is engaged and connected to the sharp pointed proximal end 20 of penetrator 18. If the adhesive 12 is in the form of a highly viscous slug, the connection may be formed by simply penetrating the sharp pointed end 20 of penetrator 18 into the end 16 of slug 12 so that the pointed end 20 is surrounded by chemical anchoring adhesive. If the adhesive 12 is in the form of a liquid adhesive wrapped in a package, the connection may be formed by pressing the pointed end 20 of penetrator 18 against the end 16 of package 12 so that the pointed end 20 is at least partially surrounded by chemical anchoring adhesive, and holding the ends together by any suitable securing technique. In the embodiment of FIG. 2, a rigid plastic jacket 32 contains the penetrator 18 and adhesive slug or package 12, and anchors them together.

The penetrator 18 also has a threaded, corrugated or otherwise roughened outer surface 30, and an internally threaded open end 22. The outer surface 30 has an outer diameter that is about equal to the diameter of a borehole in a substrate, or slightly larger, so that the penetrator 18 can clean, scrape and score the inner wall of the borehole during use of the combination 10. The open, internally threaded distal end 22 of the penetrator 18 receives and is threadably connected to proximal end 26 of threaded anchor pin 24 to form the combination 10.

It is contemplated that the combination of adhesive slug or package 12, penetrator 18 and rigid plastic jacket 32 will be sold or provided without the anchor pin 24, and the end user will connect the anchor pin 24 to the penetrator 18. However, it is also within the scope of the invention to include the anchor pin 24 connected to the penetrator 18 in the product that is sold. The jacket 32 is configured to receive, surround and contain the combination of adhesive slug or package 12 and penetrator 18 until they are used. The jacket 32 has a relatively narrow barrel portion 34, a relatively wider anchor lip portion 36, an open distal end 38 and an open proximal end 40. The open distal end 38 receives the combination of adhesive slug or package 12 and penetrator 18, and ultimately receives the proximal end 26 of anchor pin 24 when it is connected to penetrator 18. The open proximal end 40 ultimately dispenses the adhesive into the borehole, and should have an open diameter slightly less than the diameter of adhesive slug or package 12 to prevent premature discharge.

The adhesive 12 may be in the form of a slug or package of acrylic-based chemical anchoring adhesive. Examples of acrylic-based chemical anchoring adhesives are disclosed in the aforementioned patents to Kish et al. and Rancich et al., which are incorporated by reference. Broadly stated, these adhesives may include about 10-90% by weight of a methacrylic copolymer and about 10-90% by weight of a reinforcement filler. In one example, the acrylic-based chemical anchoring adhesive includes a copolymer of alkylacrylate ester and methacrylic ester monomers, about 10-90% by weight of an inorganic particulate filler, about 0.5-10% by weight of a free radical catalyst, about 0.1-5% by weight of a chain transfer agent, and about 0.01-10% by weight of an activator. In another example, the acrylic-based chemical anchoring adhesive includes an alkylacrylate ester monomer, a copolymer of alkylacrylate ester and methacrylic acid monomers, a filler, a free radical catalyst and up to about 0.5% by weight of a promoter comprising an organic salt of a transition metal. The adhesive may include two compositions which are ultimately mixed together, for instance a first part including a methacrylic ester monomer, a methacrylate ester/methacrylic acid copolymer and a filler, and a second part including a free radical catalyst.

The adhesive 12 may be in the form of a highly viscous slug or packaged slug of epoxy-based chemical anchoring adhesive. Broadly stated, these adhesives may include about 30-65% by weight of an epoxy resin and about 30-65% by weight of a reinforcement filler. Examples of highly viscous chemical anchoring adhesives are disclosed in the aforementioned patents to Surjan et al., which are incorporated by reference. These patents disclose a rope or slug of adhesive having first and second parts joined directly to each other along an interface. The first part includes a resin, and the second part includes a curing agent. Each of the first and second parts may have a viscosity of about 5 million to about 50 million centipoise. Specifically, the first part may include about 20-45% by weight of an epoxy resin, about 10-40% by weight of a first particulate filler having an oil absorption value of at least about 30, and about 40-65% by weight of second particulate filler, where at least about 70% by weight of the second particulate filler has a U.S. Sieve size between 16 and 45, inclusive. The second part may include about 5-20% by weight of an aliphatic amine compound, about 0.1-15% by weight of a tertiary amine compound, about 1-23% by weight of a first particulate filler having an oil absorption value of at least about 30, and about 52-87% by weight of a second particulate filler, where at least about 70% by weight of the second particulate filler has a U.S. Sieve size between about 16 and 45.

Examples of somewhat less viscous chemical anchoring adhesives that can be wrapped in a film wrapper to form a package are disclosed in the aforementioned patents to Liu et al, which are incorporated by reference. Again, first and second parts of chemical anchoring adhesive are joined along an interface. Each part has a viscosity of about 200,000 to about 4 million centipoise. The first part can include about 28-40% by weight of an epoxy resin, about 50-75% by weight sand, and about 2-6% by weight fumed silica. The second part includes at least a curing agent and can include about 5-25% by weight of an aliphatic amine compound, about 0.1-15% by weight of a tertiary amine compound, about 60-90% by weight sand and about 0.1-10% by weight fumed silica.

The adhesive slug or package 12 is not limited to the foregoing compositions. Other compositions of chemical anchoring adhesive including liquid adhesive contained in a package, are also within the scope of the invention.

The penetrator 18 can be made from any suitable rigid plastic or metal material. The material should be strong enough and rigid enough so that the threaded flights on the outer surface 30 scrubs and scores the inner surface of the borehole. Also, the material should be strong enough to provide mechanical assistance in anchoring the anchor pin 24 in the borehole. Particularly suitable materials for the penetrator 18 include without limitation casted zinc, steel, aluminum, polyamide, rigid polyethylene, and combinations thereof. The anchor pin 24 is typically made from stainless steel or carbon steel, but can also be made from other materials that are suitable for the end use applications. The jacket 32 can be formed of a rigid polyamide, polypropylene, polyethylene, or filled polyolefin material, or combinations thereof.

Figure 5:
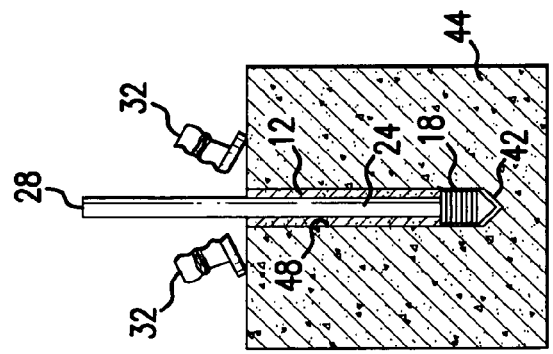
FIGS. 3-5 schematically illustrate the hammering method steps including the release and mixing of chemical anchoring adhesive in the borehole, followed by cleaning and scoring the walls of the borehole using the penetrator, followed by filling the space between the anchor pin and walls of the borehole with chemical anchoring adhesive.
Figure 4:
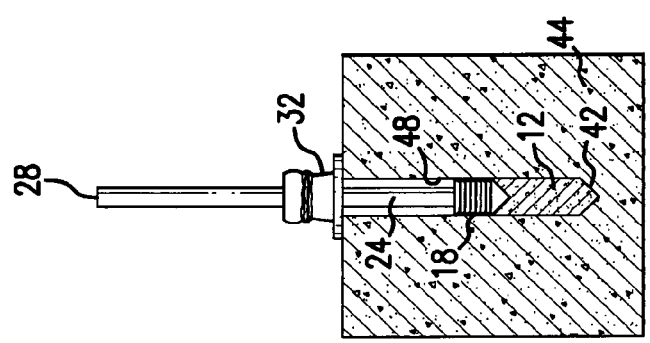
Figure 3:
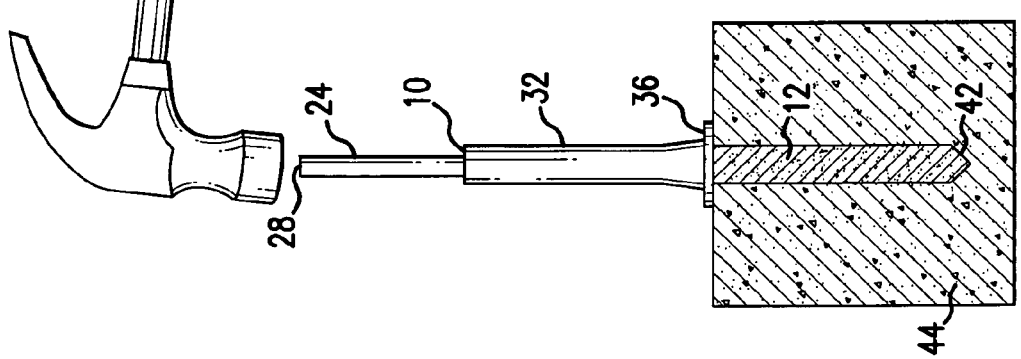

FIGS. 3-5 demonstrate how the combination 10 is inserted into a borehole 42 formed in a substrate, which can be a concrete block 44. The combination 10 is placed over the borehole 42 so that the anchor lip 36 of the jacket 32 surrounds the inlet to the borehole 42. The anchor lip 36 has a diameter wider than the diameter of the borehole 42 and provides anchoring and sealing during the subsequent driving step. A driving tool, such as a hammer 46, is applied to the distal end 28 of anchor pin 24 to pound and drive the anchor pin 24 toward the borehole 42.

As shown in FIG. 3, the pounding and driving by the hammer 46 initially causes the adhesive 12 to eject and mix in the borehole 42. As the anchor pin 24 is driven through the jacket 32 toward the borehole 42, it moves the penetrator 18 causing applied pressure on the adhesive slug or package 12.

As shown in FIG. 4, further pounding and driving by the hammer 46 drives the penetrator 18 into the borehole 42. As the penetrator 18 is driven into the borehole, it scrubs, scores and cleans the inner wall 48 of the borehole and causes further compression and mixing of the adhesive 12 in the borehole. The scrubbing and scoring of the inner wall 48 makes it more receptive to the adhesive 12. The anchor pin 24 partially enters the borehole at this stage, and the jacket 32 is compressed due to the driving and pounding.

As shown in FIG. 5, further pounding and driving by the hammer 46 drives the penetrator 18 to the bottom of the borehole 42. At this stage, anchor pin 24 is driven into the borehole as far as it will go, and the penetrator 18 provides some mechanical anchoring of the anchor pin. The fully mixed adhesive 12 squeezes past the penetrator 18 and fills the space between the anchor pin 24 and the inner wall 48 of the borehole 42. The jacket 32 fragments due to the further pounding, and is discarded. The anchor pin 24 is anchored in the borehole both by chemical anchoring adhesive and the mechanical anchoring of the penetrator 18. The anchor pin 24 and penetrator 18 firmly remain in combination.

The invention provides a simple, cost-effective integrated method for applying a chemical anchoring adhesive and anchor pin to a borehole, substantially reducing the cost of previous techniques in which separate series of steps were used to apply the adhesive and the anchor pin. Improved anchoring performance results from the supplemental mechanical anchoring caused by the penetrator 18, in addition to the chemical anchoring caused by the chemical anchoring adhesive.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

We claim:

1. A combination, comprising:
 a slug or package of chemical anchoring adhesive, the slug or package having a proximal end and a distal end;
 a rod having a sharp pointed proximal end, a distal end, and a threaded or corrugated outer surface, the sharp pointed proximal end of the rod engaging the distal end of the slug or package of chemical anchoring adhesive; and
 a jacket surrounding and containing the slug or package of chemical anchoring adhesive and the rod, the jacket having a barrel portion including an open distal end for receiving an anchor pin and an anchor lip portion including an open proximal end for dispensing chemical anchoring adhesive, wherein the anchor lip portion is axially connected to the barrel portion and has an external diameter that is wider than an external diameter of the barrel portion along an entire length of the barrel portion.

2. The combination of claim 1, wherein the rod comprises a penetrator having a sharp pointed proximal end, an open distal end, and a threaded or corrugated outer surface, the sharp pointed proximal end of the penetrator projecting into the distal end of the slug or package of chemical anchoring adhesive.

3. The combination of claim 2, further comprising an anchor pin having a proximal end and a distal end, wherein the distal end of the penetrator receives and is threadably connected to the proximal end of the anchor pin.

4. The combination of claim 2, wherein the pointed proximal end of the penetrator is surrounded by chemical anchoring adhesive.

5. The combination of claim 2, wherein the pointed proximal end of the penetrator penetrates the slug or package of chemical anchoring adhesive and is surrounded by chemical anchoring adhesive.

6. The combination of claim 1, further comprising an anchor pin having a proximal end and a distal end, the proximal end of the anchor pin connected to the distal end of the rod.

7. The combination of claim 6, wherein the proximal end of the anchor pin is threadably connected to the distal end of the rod.

8. The combination of claim 1, wherein the chemical anchoring adhesive comprises about 10-90% by weight of a methacrylic copolymer and about 10-90% by weight of a reinforcement filler.

9. The combination of claim 8, wherein the chemical anchoring adhesive comprises two compositions which are ultimately mixed together.

10. The combination of claim 1, wherein the chemical anchoring adhesive comprises about 30-65% by weight of an epoxy resin and about 30-65% by weight of a reinforcement filler.

11. The combination of claim 10, wherein the chemical anchoring adhesive comprises two compositions which are ultimately mixed together.

12. The combination of claim 1, wherein the proximal end of the rod is surrounded by chemical anchoring adhesive.

13. A combination, comprising:
 a slug or package of chemical anchoring adhesive, the slug or package having a proximal end and a distal end; and
 a penetrator having a sharp pointed proximal end, an open distal end, and a threaded or corrugated outer surface, the sharp pointed proximal end of the penetrator engaging the distal end of the slug or package of chemical anchoring adhesive so that the pointed proximal end is at least partially surrounded by chemical anchoring adhesive; and
 a jacket surrounding and containing the slug or package of chemical anchoring adhesive, the jacket having a barrel portion including an open distal end for receiving an anchor pin and an anchor lip portion including an open proximal end for dispensing chemical anchoring adhesive, wherein the anchor lip portion is axially connected to the barrel portion and has an external diameter that is wider than an external diameter of the barrel portion along an entire length of the barrel portion.

14. The combination of claim 13, wherein the jacket surrounds and contains the penetrator.

15. The combination of claim 13, comprising a threaded anchor pin having a proximal end and a distal end, the proximal end of the anchor pin connected to the open distal end of the penetrator.

16. The combination of claim 15, wherein the proximal end of the anchor pin is threadably connected to the distal end of the penetrator.

17. The combination of claim 13, wherein the pointed proximal end of the penetrator penetrates the slug or package of chemical anchoring adhesive.

18. The combination of claim 13, wherein the pointed proximal end of the penetrator is surrounded by chemical anchoring adhesive.

19. A combination, comprising:
   a slug or package of chemical anchoring adhesive, the slug or package having a proximal end and a distal end;
   a penetrator having a sharp pointed proximal end, an open distal end, and a threaded or corrugated outer surface, the pointed proximal end of the penetrator engaging the distal end of the slug or package of chemical anchoring adhesive so that the sharp pointed proximal end is surrounded by chemical anchoring adhesive; and
   a jacket surrounding and containing the slug or package of chemical anchoring adhesive and at least part of the penetrator, the jacket having a barrel portion including an open distal end for receiving an anchor pin and an anchor lip portion including an open proximal end for dispensing chemical anchoring adhesive, wherein the anchor lip portion is axially connected to the barrel portion and has an external diameter that is wider than an external diameter of the barrel portion along an entire length of the barrel portion.

20. The combination of claim 19, comprising an anchor pin having an externally threaded proximal end and a distal end, the externally threaded proximal end of the anchor pin engaging the distal end of the penetrator.

\* \* \* \* \*